United States Patent Office 3,547,998
Patented Dec. 15, 1970

3,547,998
INTERMEDIATE AND PROCESS FOR THE PREPARATION OF NORTRIPTYLINE
William B. Lacefield, Indianapolis, Ind., assignor to Eli Lilly and Company, Indianapolis, Ind., a corporation of Indiana
No Drawing. Filed Aug. 9, 1968, Ser. No. 751,336
Int. Cl. C07c 87/28
U.S. Cl. 260—570.5         7 Claims

ABSTRACT OF THE DISCLOSURE

Process for the preparation of nortriptyline, an antidepressive agent, comprising treating 5-hydroxy-5-(3-methylaminopropenyl)-10,11-dihydro-5H - dibenzo[a,d]cycloheptene with a hydrogen halide and catalytically selectively reducing the resulting intermediate.

This invention relates to a novel process for preparing derivatives of 10,11-dihydro-5H-dibenzo[a,d]cycloheptene and to a novel intermediate useful therefor. More particularly, the present invention relates to a novel process for the preparation of nortriptyline.

BACKGROUND OF THE INVENTION

Certain 5 - (3 - aminopropylidene)-10,11-dihydro-5H-dibenzo[a,d]cycloheptenes have become established as valuable therapeutic agents useful in the treatment of depressive states. One such clinically employed compound is nortriptyline, 5-(3-methylaminopropylidene) - 10,11 - dihydro-5H-dibenzo[a,d]cycloheptene. The present invention provided a novel commercial process for the preparation of nortriptyline.

SUMMARY

The process of this invention comprises a two-step synthesis of nortriptyline from a readily available starting material, 5-hydroxy-5-(3-methylaminopropenyl) - 10,11-dihydro - 5H - dibenzo[a,d]cycloheptene. The foregoing starting material is reacted with a hydrogen halide in an inert solvent to yield a 5-(2-halo-3-methylaminopropylidene) - 10,11 - dihydro-5H-dibenzo[a,d]cycloheptene as the hydrogen halide salt. Selective catalytic dehalogenation of this compound affords nortriptyline as the hydrogen halide salt.

DETAILED DESCRIPTION

The starting material for the novel process of this invention, 5-hydroxy - 5 - (3 - methylaminopropenyl)-10,11-dihydro-5H-dibenzo[a,d]cycloheptene is prepared according to the method described by L. R. Peters and G. F. Hennion, J. Med. Chem., 7, 390 (1964). Reaction of this compound with a hydrogen halide yields a 5-(2-halo-3-methylaminopropylidene) - 10,11 - dihydro-5H-dibenzo[a,d]cycloheptene hydrohalide as illustrated in the following equations:

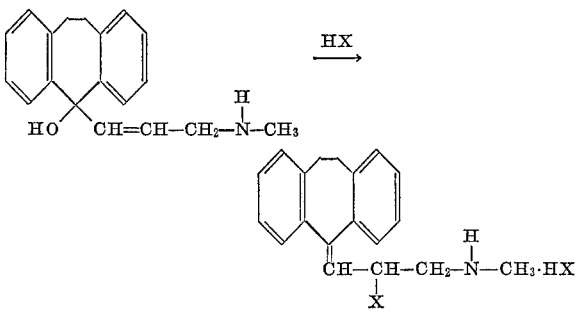

wherein X is chloro or bromo. The reaction of the hydrogen halide, with the starting material is conducted in an inert solvent, preferably a chlorinated hydrocarbon, such as chloroform, carbon tetrachloride, ethylene dichloride and the like, although other unreactive solvents known in the art can be employed if desired. The reaction is suitably carried out at a temperature between about −75 and 75° C.

When hydrogen chloride is reacted with 5-hydroxy-5-(3-methylaminopropenyl)-10,11-dihydro - 5H - dibenzo[a,d]cycloheptene in accordance with the present process, 5-(2-chloro-3-methylaminopropylidene)-10,11-dihydro-5H - dibenzo[a,d]cycloheptene hydrochloride is obtained. In analogous fashion, when hydrogen bromide is reacted with the starting material, 5-(2-bromo-3-methylaminopropylidene)-10,11 - dihydro-5H-dibenzo[a,d]cycloheptene hydrobromide is obtained as a product.

In a preferred embodiment of this invention, 5-(3-methylaminopropenyl) - 10,11 - dihydro-5H-dibenzo[a,d]cycloheptene is dissolved in a convenient volume of chloroform and the solution is saturated with anhydrous hydrogen chloride at ambient room temperature. The reaction product mixture is worked up by methods known in the art to obtain 5-(2-chloro-3-methylaminopropylidene)-10,11-dihydro-5H-dibenzo[a,d]cycloheptene as the hydrochloride salt.

The novel intermediate produced in the foregoing reaction is characterized by an allylic haloken atom in the 2-position of the 3-methylaminopropylidene side chain.

In accordance with the process of the present invention, the 5-(2-halo-3-methylaminopropylidene) - 10,11 - dihydro-5H-dibenzo[a,d]cycloheptene hydrochalide salt is then reacted with hydrogen in the presence of a hydrogenation catalyst, resulting in a selective catalytic dehalogenation to yield nortriptyline as the hydrohalide salt without the concurrent addition of hydrogen to the carbon in carbon double bond of the side chain.

The selective dehalogenation is carried out under a hydrogen pressure of from about atmospheric pressure up to about 500 p.s.i.g., and at a temperature between about 0 and 55° C. until one molar equivalent of hydrogen has been reacted to produce nortriptyline hydrohalide. The reaction is conducted in an unreactive solvent. Solvents commonly employed in hydrogenation reactions and which are unreactive with respect to the starting material and product of the present process can be employed. Thus, for example, methanol, ethanol, tetrahydrofuran and acetic acid are suitable for use as solvents in the dehalogenation process.

The hydrogenation catalyst is preferably selected from the group of noble metal catalysts such as platinum and palladium; however, other hydrogenation catalysts, for example Raney nickel, can be employed if desired.

A weakly basic acid acceptor can be added to the reaction mixture with beneficial effects on the yield of nortriptyline. The acid acceptor serves to remove the hydrogen halide liberated during the selective dehalogenation reaction and is added in an amount sufficient to react with substantially all of the hydrogen halide formed during the reaction.

The 5 - (2 - halo - 3 - methylaminopropylidene) - 10,11-dihydro - 5H - dibenzo[a,d]cycloheptene is employed in the present process preferably in the hydrohalide salt form. When the halo derivative is employed as the free base, undesirable side reactions occur during the catalytic dehalogenation reaction, resulting in lower yields of nortriptyline. Accordingly, the acid acceptor employed in the dehalogenation step is desirably a weak base which is compatible with the protonated form of the 2-halo amine intermediate, and hence, incapable of liberating the free base. Weak bases such as sodium acetate, potassium acetate, N,N-diethylaniline, pyridine, and the like can be employed with success.

According to the process of the present invention, the selective catalytic dehalogenation of the 2-halo intermediate is best achieved by stopping the reaction after the absorption of one molar equivalent of hydrogen. Although a significant decrease in the rate of consumption of hydrogen is usually noted following the absorption of one-equivalent, absorption of hydrogen contitnues with the formation of dihydronortriptyline as a side-product. Avoidance of over hydrogenation, particularly at higher temperatures and pressures, affords higher yields of nortriptyline.

In a preferred embodiment of the present invention the 5 - (2 - halo - 3 - methylaminopropylidene) - 10,11 - dihydro - 5H - dibenzo[a,d]cycloheptene hydrochloride intermediate is dissolved in acetic acid and sodium acetate and platinum oxide are added. The mixture is hydrogenated on a Parr low pressure hydrogenation apparatus under an initial hydrogen pressure of 45 p.s.i.g. at room temperature until one molar equivalent of hydrogen is taken up. The reaction product, nortriptyline hydrochloride, is isolated from the reaction product mixture by methods known and commonly employed in the art. Nortriptyline can be obtained as the free base by neutralization of the hydrochloride salt with an appropriate base.

Alternatively, the preparation of nortriptyline from 5-hydroxy - 5 - (3 - methylaminopropenyl) - 10,11 - dihydro-5H - dibenzo[a,d]cycloheptene can be carried out as a single step reaction without isolation of the intermediate 5 - (2 - halo - 3 - methylaminopropylidene) - 10,11 - dihydro - 5H - dibenzo[a,d]cycloheptene hydrohalide. In the alternative procedure, the starting material is reacted with hydrogen in the presence of a hydrogenation catalyst and concentrated hydrochloric or hydrobromic acid until one molar equivalent of hydrogen has reacted, to yield the corresponding nortriptyline hydrohalide.

The one-step reaction is carried out in an inert solvent such as methanol, ethanol or tetrahydrofuran under a hydrogen pressure of from atmospheric pressure up to about 500 p.s.i.g. The reaction is conveniently carried out at a temperature between about 0 and 55° C. in the presence of a hydrogenation catalyst selected from the platinum metals group. Typically, the starting material, catalyst and equal volumes of ethanol and concentrated hydrochloric acid are charged into a Parr hydrogenation apparatus and the mixture reacted with hydrogen under a pressure of 45 p.s.i.g. at about ambient room temperature until the theoretical amount of hydrogen has been absorbed. The product, nortriptyline hydrochloride, is recovered from the reaction product mixture by procedures known in the art.

The alternative synthesis of nortriptyline from 5-hydroxy - 5 - (3 - methylaminopropenyl) - 10,11 - dihydro-5H - dibenzo[a,d]cycloheptene offers the practical advantage of a one-step preparation. However, the previously described two-step process involving the isolation of the intermediate 5 - (2 - halo - 3 - methylaminopropylidene)-10,11 - dihydro - 5H - dibenzo[a,d]cycloheptene hydrohalide is the preferred method of the present invention because of the superior yields of nortriptyline obtained therewith.

The novel process of the present invention is further illustrated by the following examples.

EXAMPLE 1

5-(2-chloro-3-methylaminopropylidene)-10,11-dihydro-5H-dibenzo[a,d]cycloheptene hydrochloride Five grams of 5 - hydroxy - 5 - (3 - methylaminopropenyl) - 10,11 - dihydro - 5H - dibenzo[a,d]cycloheptene, were dissolved in 200 ml. of warm (40° C.) chloroform and the resulting solution was saturated with anhydrous hydrogen chloride. The reaction mixture was evaporated in vacuo to one-half of the original volume and poured into 400 ml. of anhydrous ether. The crude 5-(2-chloro-3-methylaminopropylidene) - 10,11 - dihydro - 5H - dibenzo[a,d]cycloheptene precipitated as the hydrochloride salt and was filtered and purified by recrystallization from chloroform-ether (1:5). The purified product melted at about 141–143° C. with decomposition. Ultraviolet absorption: $\lambda_{max.}$(EtOH) 243 m$\mu$. E 15,000.

Analysis for $C_{19}H_{21}Cl_2N$ (HCl salt).—Calculated (percent): C, 68.26; H, 6.33; Cl, 21.24. Found (percent): C, 68.37; H, 6.40; Cl, 20.97.

5-(3-methylaminopropylidene)-10,11-dihydro-5H-dibenzo[a,d]cycloheptene hydrochloride A mixture comprising 3.3 g. of sodium acetate, 0.1 g. of platinum oxide and 200 ml. of glacial acetic acid was prereduced in a Parr low pressure hydrogenation apparatus under a hydrogen pressure of 45 p.s.i.g. before 3.4 g. of 5-(2 - chloro-3-methylaminopropylidene) - 10,11-dihydro - 5H - dibenzo[a,d]cycloheptene were added. Reduction under a hydrogen pressure of 45 p.s.i.g. was carried out until 0.01 mole of hydrogen was absorbed. The reaction mixture was filtered to remove the catalyst and the filtrate was evaporated in vacuo to yield a residue. The residue was dissolved in 10 ml. of water, and the solution was cooled in an ice bath and made strongly basic by the addition of 10 ml. of 50% sodium hydroxide. The reduction product was extracted from the basic mixture with 500 ml. of ether and the extract was washed with 25 ml. portions of water and dried over sodium sulfate. The dried extract was filtered to remove the drying agent and treated with anhydrous hydrogen chloride. The crude reduction product precipitated as the hydrochloride salt, which was filtered and purified by recrystallization from ethanol-ether (1:10) to yield 1.4 g. of 5-(3-methylaminopropylidene - 10,11 - dihydro - 5H - dibenzo[a,d] cycloheptene hydrochloride (nortriptyline hydrochloride).

The reduction product was identical with an authentic sample of nortriptyline hydrochloride as shown by mixed melting point, and comparison of infrared, ultraviolet and N.M.R. spectra.

Analysis for $C_{19}H_{22}ClN$ (HCl salt).—Calculated (percent): C, 76.11; H, 7.39; Cl, 11.82; N, 4.67. Found (percent): C, 76.04; H, 7.64; Cl, 11.84; N, 4.90.

EXAMPLE 2

Alternate preparation of nortriptyline hydrochloride

Five grams of 5-hydroxy-5-(3-methylaminopropenyl)-10,11 - dihydro - 5H - dibenzo[a,d]cycloheptene, 100 ml. of ethyl alcohol, 100 ml. of concentrated hydrochloric acid and 500 mg. of platinum oxide were placed in a Parr low pressure hydrogenation bottle which was then pressurized to 45 p.s.i.g. with hydrogen. The hydrogenation was carried out at room temperature until the theoretical amount of hydrogen was absorbed. The reaction mixture was filtered and poured into ice-water. The resulting aqueous solution was made basic by the addition of a 50% sodium hydroxide solution and the free base of nortriptyline was extracted with ether. The extract was washed with water, dried and treated with anhydrous hydrogen chloride resulting in the formation of a gummy precipitate. The ether was decanted from the precipitate which, on treatment with dry acetone, crystallized to yield 1.4 g. of product melting at about 198–201° C. A mixed melting point with an authentic sample of nortriptyline hydrochloride was not depressed.

I claim:

1. The compound of the formula

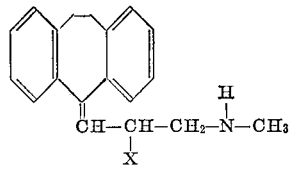

wherein X is chloro or bromo, and the acid addition salts thereof.

2. A compound according to claim 1 said compound being 5-(2 - chloro - 3 - methylaminopropylidene)-10,11-dihydro-5H-dibenzo[a,d]cycloheptene.

3. A compound according to claim 1 said compound being 5-(2 - bromo - 3 - methylaminopropylidene)10,11-dihydro-5H-dibenzo[a,d]cycloheptene.

4. The process for the manufacture of nortriptyline hydrohalide which comprises:
 (a) reacting 5-hydroxy - 5 - (3-methylaminopropenyl)-10,11 - dihydro - 5H-dibenzo[a,d]cycloheptene with a hydrogen halide in an inert solvent to yield as an intermediate the compound of claim 1.
 (b) reacting the latter compound with hydrogen in an inert solvent in the presence of a hydrogenation catalyst until one molar equivalent of hydrogen has reacted to yield the desired product.

5. The process of claim 4 wherein the hydrogen halide is hydrogen chloride.

6. The process of claim 4 wherein the hydrogen halide is hydrogen bromide.

7. The process of claim 4 wherein the process is carried out in a single reaction step without isolation of the intermediate compound.

References Cited
UNITED STATES PATENTS 3,177,209  4/1965  Holm _____ 260--570.8X ROBERT V. HINES, Primary Examiner U.S. Cl. X.R.

260—570.8